UNITED STATES PATENT OFFICE.

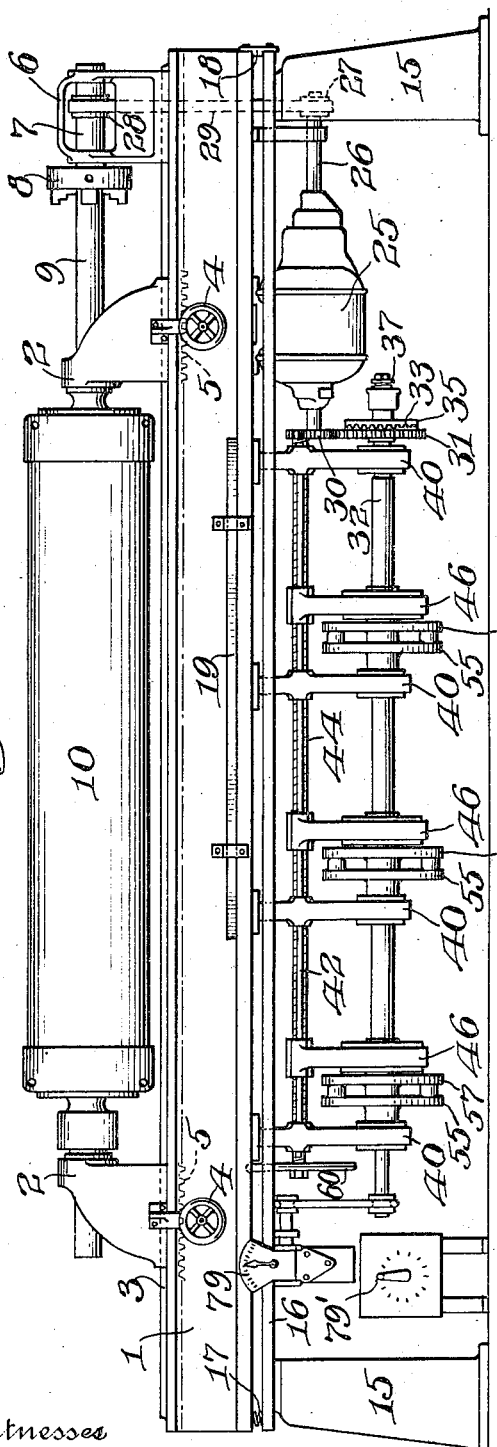

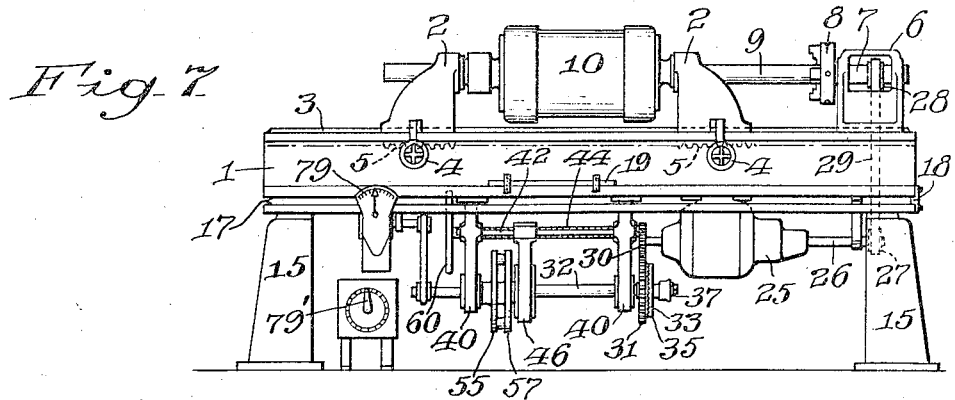
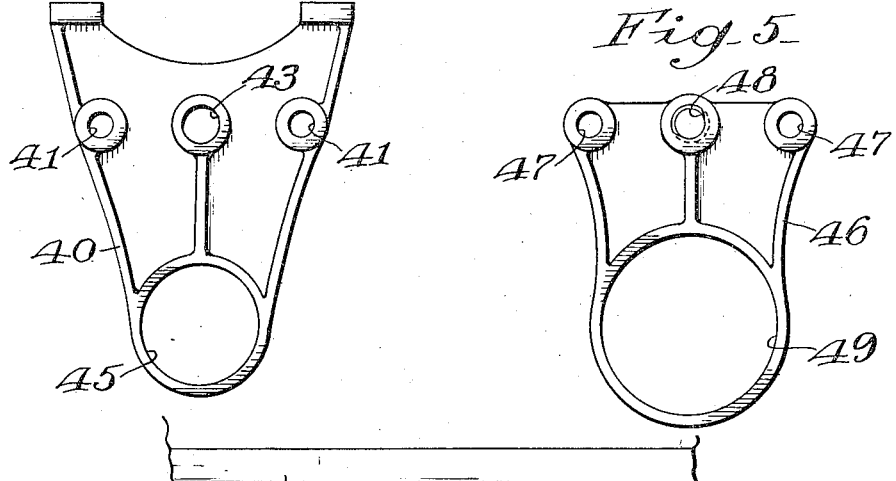
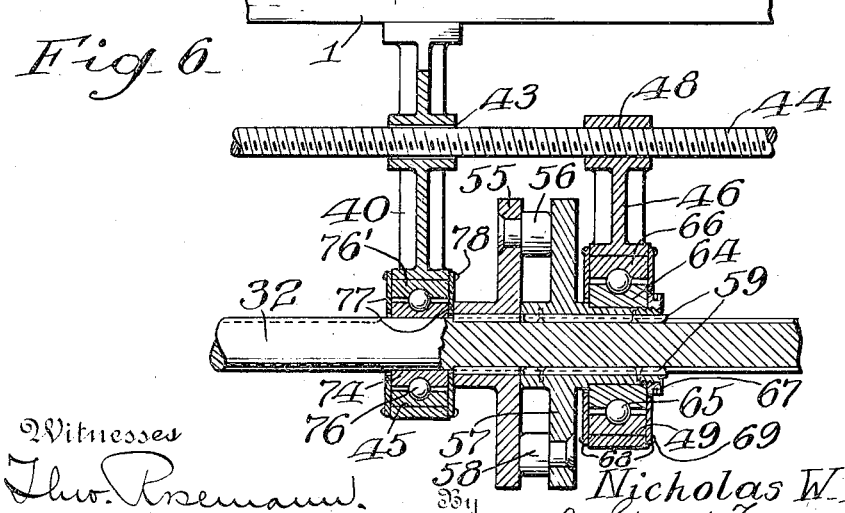

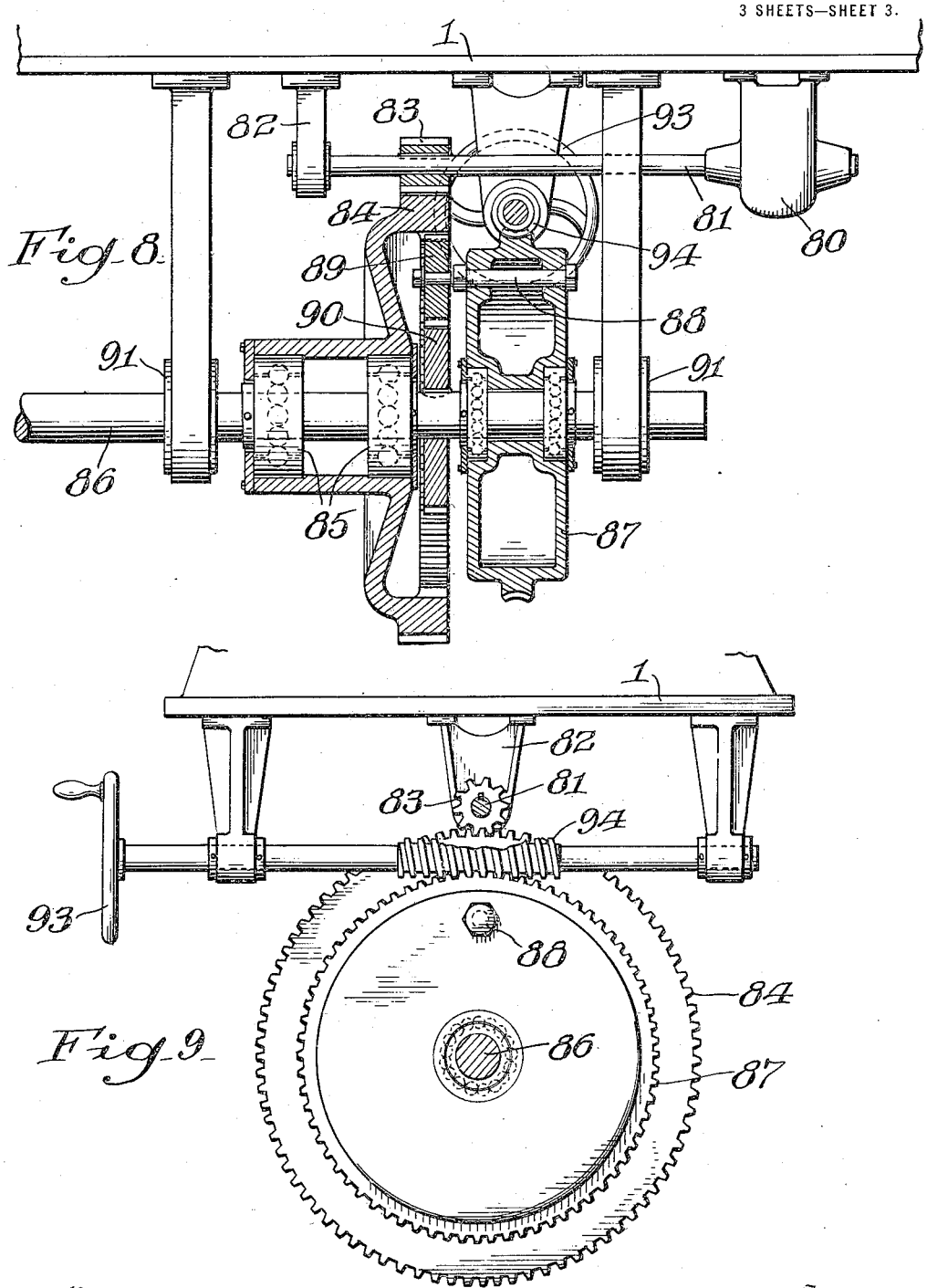

NICHOLAS W. AKIMOFF, OF PHILADELPHIA, PENNSYLVANIA, ASSIGNOR TO DYNAMIC BALANCING MACHINE COMPANY, OF PHILADELPHIA, PENNSYLVANIA.

DYNAMIC BALANCING-MACHINE.

1,296,608.  Specification of Letters Patent.  Patented Mar. 11, 1919.

Application filed July 20, 1916, Serial No. 110,275. Renewed July 6, 1918. Serial No. 243,700.

*To all whom it may concern:*

Be it known that I, NICHOLAS W. AKIMOFF, a subject of the Czar of Russia, residing at Philadelphia, in the county of Philadelphia and State of Pennsylvania, have invented certain new and useful Improvements in Dynamic Balancing-Machines, of which the following is a specification.

This invention relates to further developments in the evolution of the art of mechanisms for dynamically balancing rotatable bodies while the same are in motion.

While the device described in application Serial No. 32,296 is not limited to any definite size of body to be balanced, it is practically necessary to provide a plurality of squirrel cages in many instances in which numerous types of bodies of widely different proportions are being balanced.

This partial restriction of the desired universal nature of the device was removed by the invention of the forms of the device described in application Serial No. 59,659, but the expense and inherent delicacy of the squirrel cage balancing mechanism remain.

The next step, namely, that of eliminating the said squirrel cage with its multiplicity of balancing couple-producing weights, and substituting therefor a much simpler, less expensive and more efficient balancing mechanism, is described in detail in application Serial No. 87,926.

However, even in view of the foregoing development the acme of simplicity, together with a simultaneous efficiency of operation of the principles involved, were not known until the present invention which makes use of, and at the same time improves upon, the principles involved in those devices referred to, as well as amplifying the vibratory tendency of the supports of an unbalanced body according to the invention described in application Serial No. 36,573.

The object of the present invention is to provide a device which makes it possible to balance dynamically thereby bodies of an indefinite range of sizes and shapes with the identical apparatus, in each case operating with the greatest efficiency and while at any desired speed, and without necessitating the substitution of any elements of the device.

There is also provided in this invention the combination of a rotatable mounting for bodies to be tested and means to drive the former, a plurality of sets of rotatable weights revoluble upon one or more axes in a plane with the axis of rotation of the said body to be tested, means to adjust one or more of the said weights while the device as a whole is in operation to neutralize or counteract the vibratory effect of an unbalanced condition of the body being tested, and means to shift said weights circumferentially of their respective orbits while in motion, to assume a different angular position with respect to that of the said body, thereby making it possible to directly find the required plane of balance.

Further and detailed objects of the invention, its construction and operation are fully brought out in the following description, when read in conjunction with the accompanying drawings in which Figure 1 is a front elevation of the preferred embodiment of the machine; Fig. 2 is a detail view of a simple form of azimuth altering mechanism; Fig. 3 is an end elevation of the same; Fig. 4 is an elevation of one of the hangers; Fig. 5 is a similar view of a yoke; Fig. 6 is a detail view of one of the balancing units and its bearing; Fig. 7 is a front elevation of a modified form of the machine comprising but one balancing unit; Fig. 8 is a vertical section of an improved mechanical azimuth adjusting mechanism; Fig. 9 is an end elevation of the same.

Referring to Figs. 1 to 3 of the drawings, there is shown a frame or bed 1, upon which are mounted a plurality of stocks or bearings rests 2, adapted to be moved longitudinally upon rails 3 by means of a wheel and pinion 4 engaging rack teeth 5 upon said bed. Also, mounted upon said bed is a head stork 6, supporting a counter shaft 7, which in turn carries a suitable chuck 8, adapted to grip the adjacent end portion of a shaft 9, to which latter is directly secured and mounted to rotate a body 10, the dynamic balance of which it is desired to determine and perfect.

A suitable base for the machine is provided comprising legs 15, to the upper portions of which are secured spaced members of a frame 16, said frame supporting the bed 1 by interposed springs 17 at one end, having a predetermined natural period of vibration under a given load, and at the other end by yielding members 18 operating as hinges, about which the said bed oscillates in a preferably vertical plane as said springs expand and contract with the vibration of the bed caused by the revolving of the body 10 in an unbalanced condition.

Secured in any suitable manner to the said bed is one, or a plurality of, weights 19 adapted to be freely moved longitudinally of said bed and operative by such adjustment to alter the natural period of vibration of a given spring, or set of springs, when supporting a given load into any desired frequency, thereby making it possible, without necessitating a substitution of springs, to make any one spring respond to the vibrations caused by an indefinite number of unbalanced bodies having different weights, and revolved at an indefinite number of speeds, the result being an increase in the universal character of the machine.

Secured to and preferably suspended from the under side of the bed 1 is a suitable motor 25, having a shaft 26, carrying a pulley 27, adapted to drive the pulley 28 upon the shaft 7 by means of a belt 29, or other suitable system of power transmission. The opposite end of the said motor shaft carries a pinion 30, which meshes with the teeth of a gear 31, loosely mounted upon a shaft 32, and provided with laterally extending teeth 33 upon one of its faces. Meshing with said last-named teeth is a series of similar teeth 34 upon the adjacent face of a disk 35, which is fixed to said shaft by a key 33ª but yieldingly maintained in operative engagement with the gear 31 by a coil spring 36, surrounding the said shaft 32 and held in position by a washer and bolt 37. With this construction the said motor drives the body 10 and shaft 32 in absolute synchronism.

The portion of said disk member 35 adjacent to said coil spring may be of any suitable shape, but in this simplest form of azimuth adjusting mechanism it is preferably shaped to form a convenient grip for one's hand in manually operating the same. A different form and operation of the device, whereby the relative adjustment of the respective azimuths of the shaft 32 and shaft 9 is accomplished while the same are in motion, is hereinafter fully described in detail, but the above form is thoroughly efficient, particularly when bodies are being tested and balanced which are of such size that the time required to start and stop them is of small consequence.

Further supported by the bed 1 is a series of hangers 40, each provided with a plurality of apertures 41 through which pass as many parallel guide and supporting rods 42, an aperture 43 through which passes and is adapted to revolve a screw 44, and an aperture 45 in which is secured a journal box for revolubly supporting the shaft 32 at spaced intervals. Said rods 42 in turn slidably support yokes 46, each in turn provided with a plurality of apertures 47 to receive said rods, an aperture 48 having an internal screw thread coöperating with the spiral thread of the screw 44, and relatively large aperture 49 adapted to receive the journal box for revolubly supporting one element of the adjacent balancing unit hereinafter described.

The arrangement of the balancing mechanism employed in this device consists of one or more units, each comprising a plate 55 to which is secured in a fixed position a weight 56, and disk 57 to which is fixedly secured a weight 58 in a position diametrically opposite to said first weight. Said plate is secured against longitudinal movement upon the shaft 32, but the disk 57, by means of any suitable form of key 59 and key-way, is adapted to move at will longitudinally of said shaft, its position being governed by the adjacent yoke 46, which in turn is controlled simultaneously with the others of said yokes by the screw 44, manually operated by a hand-wheel 60 upon one end thereof.

The preferable construction of the journal boxes for the shaft 32 comprises a collar 64 secured to the said shaft and peripherally grooved to receive balls 65 also movable within grooves in the adjacent surface of a ring 66 seated within the aperture 49 in the yoke, said collar being locked in position by means of a nut 67, and the ball-bearing being maintained and protected by means of oppositely positioned collars 68 secured in place in any suitable manner as by the bolts 69. In this way the disk and its weight are movable at will upon the said shaft by means of the said yoke, and regardless of the speed of operation of the device there is practically no friction between the two.

The coöperation of the shaft 32 with the hangers 40 is somewhat similar to that existing between the said shaft and the yokes 46. A sleeve 74 is secured to the shaft by means of a nut 75, and peripherally grooved to receive balls 76 also movable in a groove in the wall of a ring 76' seated within the aperture 45, said balls being protected by suitable collars 77, secured in position by means of bolts 78 or the like. And, to directly indicate the speed of said shaft, and thereby that of the body being tested, a suitable tachometer 79 is provided.

The motor is preferably controlled by a variable speed rheostat 79' with the usual system of electrical connections (not shown), and while the exact number of the teeth 33 upon the gear 31 and the teeth 34 upon the disk 35 is not absolutely essential, it has been found advisable to make the same of such quantity that relatively small angular adjustments may be made between the body being balanced and the balancing units in the manner above described. Also, if desired, a dial and pointer, or similar indicating device, may be used to show the extent of movement between said gear and disk, though this is not necessary. And, further instead of employing a series of balancing units in a given machine, the latter may be equipped with but one such unit when balancing relatively small bodies, this construction being clearly illustrated by Fig. 7.

For the purpose of mechanically altering the azimuth of the testing body of the machine with respect to that of the body being tested, there is provided a novel device comprising the construction illustrated by Figs. 8 and 9. The usual motor 80 is secured to the bed 1 and its shaft 81, supported by a bracket 82, carries a pinion 83, adapted to mesh with the external teeth of a gear wheel 84, rotatably mounted by means of ball-bearings 85 upon the shaft 86, which carries the hereinbefore described testing weights (not shown).

Also, loosely mounted upon the said latter shaft is a frame 87, to which is secured one or more suitable pins 88 carrying a corresponding number of idler pinions 89, meshing with inwardly extending teeth on the gear wheel 84. Each pinion also meshes with the teeth of a gear 90 secured to the shaft 86, and it is readily apparent that with this arrangement the said motor turning the pinion 83, drives the gear wheel 84, idler 89, and thus said gear 90 and shaft 86, which is suitably supported by antifriction bearings in brackets 91.

When it is desired to find the plane of unbalance in the body being tested, and such plane is angularly situated with respect to the original position of the plane occupied by the weights of the balancing units, a wheel 93 is operated, thereby turning a worm 94 and revolving the frame 87 by cooperation with a worm gear upon the periphery thereof, said wheel being operated manually. This action alters the position of the pin 88 with respect to the gear 84 and in so doing rotates the gear 90 and shaft secured thereto with respect to said first gear, changing the angular positions of respective balancing units and body being tested as and to the exact degree desired, irrespective of the speed at which the machine is revolving. Thus, not only can a certain number of angular positions be obtained, as by the method above described, but any degree of adjustment is made possible, no matter how small and simultaneously with either a constant or varying speed of the apparatus, as may be desired.

Having thus described my invention, what I claim and desire to protect by Letters Patent of the United States is:—

1. A balancing machine, comprising a rotatable support for a body to be tested, a plurality of rotatable units revoluble upon an axis out of coincidence with the axis of rotation of said support, each of said units being provided with adjustable parts to alter its state of dynamic balance, a vibratory base to which said support and said units are rigidly secured, and means operative to drive said support and said units in synchronism.

2. A balancing machine, comprising a rotatable support for a body to be tested, a plurality of rotatable units revoluble upon an axis out of coincidence with the axis of rotation of said support, each of said units being provided with adjustable parts to alter its state of dynamic balance, a vibratory base to which said support and said units are rigidly secured, means to actuate corresponding parts of a plurality of said units independently of the remaining parts, and means operative to drive said support and said units in synchronism.

3. A balancing machine, comprising a rotatable support for a body to be tested, a plurality of rotatable units revoluble upon an axis out of coincidence with the axis of rotation of said support, each of said units being provided with adjustable parts to alter its state of dynamic balance, a vibratory base to which said support and said units are rigidly secured, means to actuate corresponding parts of a plurality of said units simultaneously and independently of the remaining parts, and means operative to drive said support and said units in synchronism.

4. A balancing machine, comprising a rotatable support for a body to be tested, a plurality of rotatable units revoluble upon an axis out of coincidence with the axis of rotation of said support, each of said units being provided with adjustable parts to alter its state of dynamic balance, a vibratory base to which said support and said units are rigidly secured, means to actuate longitudinally of their axis of rotation corresponding parts of a plurality of said units simultaneously and independently of the remaining parts, and means operative to drive said support and said units in synchronism.

5. A balancing machine, comprising a rotatable support for a body to be tested, a plurality of rotatable units revoluble upon an axis out of coincidence with the axis of rotation of said support, each of said units being provided with adjustable parts to alter the state of its dynamic balance, a vibratory base to which said support and said units are rigidly secured, means to actuate corresponding parts of a plurality of said units simultaneously and independently of the remaining parts, while said units and said body are in motion, and means operative to drive said support and said units in synchronism.

6. A balancing machine, comprising a rotatable support for a body to be tested, a plurality of rotatable units revoluble upon an axis out of coincidence with the axis of rotation of said support, each of said units being provided with adjustable parts to alter its state of dynamic balance, a vibratory base to which said support and said units are rigidly secured, means to actuate longitudinally of their axis of rotation corresponding parts of a plurality of said units simultaneously and independently of the remaining parts and while said units and said body are in motion, and means operative to drive said support and said units in synchronism.

7. A balancing machine, comprising a rotatable support for a body to be tested, a plurality of rotatable units provided with adjustable parts to alter the degree of their dynamic balance, a vibratory base to which said support and said units are rigidly secured, while they are rotating, and means operative to revolve said support and said units in absolute synchronism.

8. A balancing machine, comprising a rotatable support for a body to be tested, a plurality of rotatable units provided with adjustable parts to alter the degree of their dynamic balance while they are rotating, said units being rotatable about an axis out of coincidence with the axis of rotation of said support, a vibratory base to which said support and said units are rigidly secured, and means operative to revolve said support and said units in absolute synchronism.

9. A balancing machine, comprising a rotatable support for a body to be tested, a plurality of rotatable units provided with adjustable parts to alter the degree of their dynamic balance while they are rotating, said units being rotatable about an axis out of coincidence with the axis of rotation of said support but in a common plane, a vibratory base to which said support and said units are rigidly secured, and means to revolve said support and said units in synchronism.

10. A balancing machine, comprising a rotatable support for a body to be tested, a plurality of rotatable units provided with adjustable parts to alter the degree of their dynamic balance while they are rotating, said units being rotatable about an axis spaced from but parallel with the axis of rotation of said support, a vibratory base to which said support and said units are rigidly secured, and means operative to revolve said support and said units in synchronism.

11. The combination of a plurality of units rotatable about an axis passing through their centers of mass and provided with adjustable weights operative to create a centrifugal couple, a support for a body associated to rotate synchronously with the said units and about an axis spaced from said first axis, and a vibratory base to which said support and said units are rigidly secured, said units being operative to neutralize a centrifugal couple in a body carried by said support.

12. The combination of a balancing unit adapted to be revolubly associated with a body to be tested, means to drive said unit and body synchronously, and means to alter the circumferential position of said unit with respect to that of said body while said unit and body are in motion.

13. The combination of a rotatable system including a plurality of units, each comprising weights eccentric to and relatively movable along a common axis, means whereby said system is revolubly associated with a rotatable body to be tested, and means whereby corresponding weights of said units are connected to move in unison longitudinally of their common axis.

14. The combination of a rotatable system including a plurality of units, each comprising weights eccentric to and relatively movable along a common axis, means whereby said system is revolubly associated with a rotatable body to be tested, and means whereby corresponding weights of said units are connected to move in unison longitudinally of their common axis, to create a centrifugal couple operative to neutralize a centrifugal couple in the body being tested.

15. The combination of a rotatable system including a plurality of units, each comprising weights eccentric to and relatively movable along a common axis, means whereby said system is revolubly associated with a rotatable body to be tested, and means whereby corresponding weights of said units are connected, and means to move the weights in the respective units simultaneously in opposite directions.

16. The combination of a rotatable system including a plurality of units, each comprising weights, means whereby said system is revolubly associated with the rotatable body to be tested, said system and said body being rotatable about parallel axes passing through their respective centers of mass, means whereby said units are connected and means to alter the angular relation of said units with respect to said body.

17. The combination of a rotatable system including a plurality of units, each comprising weights, means whereby said system is revolubly associated with the rotatable body to be tested, said system and said body being rotatable about parallel axes passing through their respective centers of mass, means whereby said units are connected and means to alter the angular relation of said units with respect to said body, while said units and said body are in motion.

18. The combination of a rotatable system including a plurality of units, each comprising weights, means whereby said system is revolubly associated with a rotatable body to be tested, said system and said body being rotatable about parallel axes passing through their respective centers of mass, means whereby corresponding weights of said units are connected means to alter the angular relation of said units with respect to said body, and means to alter the relative positions of the planes of rotation of said connected weights.

19. The combination of a rotatable system including a plurality of units, each comprising weights, means whereby said system is revolubly associated with a rotatable body to be tested, said system and said body being rotatable about parallel axes passing through their respective centers of mass, means whereby corresponding weights of said units are connected, means to alter the angular relation of said units with respect to said body, and means to alter the relative positions of the planes of rotation of said connected weights while said units and said body are in motion.

20. The combination of a rotatable system including a plurality of units, connected to revolve in unison, each comprising weights, whereby said system is revolubly associated with a revoluble body to be tested, corresponding weights being rotatable about parallel axes passing through their respective centers of mass, means to alter the angular relation of said units with respect to said body, and means to alter the relative axial positions of the planes of movement with diametrically disposed weights of said units.

21. The combination of a rotatable system including a plurality of units, connected to revolve in unison, each comprising weights, whereby said system is revolubly associated with a revoluble body to be tested, corresponding weights being rotatable about parallel axes passing through their respective centers of mass, means to alter the angular relation of said units with respect to said body, and means to alter the relative axial positions of the planes of movement of diametrically disposed weights of said units both of said means being operative while said weights and said body are in motion.

In testimony whereof I have affixed my signature in presence of a witness.

NICHOLAS W. AKIMOFF.

Witness:
J. STUART FREEMAN.